United States Patent
Kangas

[19]

[11] Patent Number: 5,923,526
[45] Date of Patent: Jul. 13, 1999

[54] ARRANGEMENT FOR ATTACHING AN ELECTRICAL COMPONENT TO A MOUNTING BASE

[75] Inventor: Simo Kangas, Vaasa, Finland

[73] Assignee: ABB Transmit Oy, Vaasa, Finland

[21] Appl. No.: 08/875,550

[22] PCT Filed: Jan. 29, 1996

[86] PCT No.: PCT/FI96/00055

§ 371 Date: Jul. 10, 1997

§ 102(e) Date: Jul. 10, 1997

[87] PCT Pub. No.: WO96/24235

PCT Pub. Date: Aug. 8, 1996

[30] Foreign Application Priority Data

Jan. 30, 1995 [FI] Finland .................................... 950404

[51] Int. Cl.[6] .................................................. H02B 1/01
[52] U.S. Cl. ........................... 361/627; 336/65; 336/107; 336/210; 361/823; 361/836
[58] Field of Search .............................. 336/65, 105, 107, 336/210; 361/623–624, 627, 732–733, 807, 809–811, 822, 823, 824, 828, 836

[56] References Cited

U.S. PATENT DOCUMENTS

| | | | |
|---|---|---|---|
| 4,296,454 | 10/1981 | Wong ........................................ | 361/380 |
| 4,527,285 | 7/1985 | Kekas ....................................... | 361/393 |
| 4,652,975 | 3/1987 | Scott ........................................ | 361/404 |
| 4,858,076 | 8/1989 | Tsai .......................................... | 361/836 |
| 4,884,048 | 11/1989 | Castonguay et al. ...................... | 335/18 |
| 4,901,182 | 2/1990 | Book .......................................... | 361/38 |
| 4,929,920 | 5/1990 | Meiners et al. .......................... | 335/202 |
| 4,939,491 | 7/1990 | Nissly et al. .............................. | 335/18 |
| 5,087,875 | 2/1992 | Balch et al. .............................. | 324/157 |
| 5,276,583 | 1/1994 | Tyson ....................................... | 361/826 |

*Primary Examiner*—Gregory Thompson
*Attorney, Agent, or Firm*—Watson Cole Grindle Watson P.L.L.C.

[57] ABSTRACT

An arrangement for attaching electrical inductive components to a terminal block of a mounting base utilizes interlocking male and female plug-in connections. In instances where the electrical inductive components are measuring transformers, the arrangement accommodates higher electric currents in the area of several amperes seen in the primary winding because a galvanic connection is established simultaneously when the mechanical connection is made. Accordingly, the wiring of the primary circuit is made rapidly and without the possibility of faulty coupling. As the number of electrical inductive components increases, the arrangement disclosed provides compact construction.

7 Claims, 3 Drawing Sheets

ARRANGEMENT FOR ATTACHING AN ELECTRICAL COMPONENT TO A MOUNTING BASE

BACKGROUND OF THE INVENTION

The invention relates to an arrangement for attaching an electrical component to a mounting base and for connecting it galvanically to a terminal block connected to the mounting base. The arrangement of the invention is particularly suitable for use with components carrying higher currents, for example inductive components such as measuring transformers.

If the mounting base is a printed board, various soldering techniques are typically employed for attaching electrical components mechanically to the mounting base and for connecting them electrically to the terminal block connected to the mounting base. However, such techniques cannot be employed with higher currents, since the cross-sectional area of copper foil strips on conventional printed boards is not sufficient for conducting such currents. A typical example of a component carrying higher currents is a measuring transformer. In the following, known solutions will be dealt with particularly in the case of measuring transformers.

Transformers implemented as laminated core transformers are typically attached to the mounting base by iron binders which are secured to the base either by screws or other mechanical fasteners, such as rivets, or by bending the ends of the iron binders so that they attach the transformer mechanically to the base. The terminals for the primary and secondary winding in the transformers are provided by unfixed conductors. This conventional securing technique involves the laborious step of securing the iron binders. Providing the terminals in the transformers by unfixed conductors, in turn, entails the possibility of faulty coupling; in addition, it is very difficult to check the coupling visually, particularly if the there are several measuring transformers on the base, which is often the case.

In the same way as a laminated core transformer, it is possible to attach a toroidal transformer mechanically to the base either from its case or by a fastening means screwed through its centre. Even in this case, the terminals for the primary and secondary winding are provided by unfixed conductors. A toroidal transformer is thus not different from a laminated core transformer as regards the problems associated with the securing and coupling.

One alternative is to attach the transformer to a printed board from solder-tags and to provide the wiring by means of copper foil strips on the printed board. This printed board solution is, however, often uneconomic, since the copper foil strips must be made thicker than usual in order to provide conductors with a sufficient cross-sectional area. Moreover, the requirements set by the norms for the current-carrying capacity are not met if soft soldering is used.

Transformers which are moulded in plastic and in which terminals are soldered to the ends of the primary windings are also used to some extent in the field. However, moulding transformers in plastic requires large series, and because of the many different combinations, the production control and storage incur extra costs. The more there are transformers, the more difficult it is to mount them on a base and to provide a compact construction.

It should also be noted that in the case of measuring transformers it is necessary to apply the norm DIN 57435, concerning static measuring and protection relays. According to this norm, the requirement for continuous current-carrying capacity is a quadruple nominal current, the requirement for continuous thermal current-carrying capacity for one second is a hundredfold nominal current, and the requirement for dynamic current-carrying capacity is 2,5-fold thermal current-carrying capacity for one half-cycle. If the nominal current is, for example, 5 A, the requirement for continuous thermal current-carrying capacity grows to 500 A for 1 s, and the requirement for dynamic current-carrying capacity grows to 1250 A.

SUMMARY OF THE INVENTION

The object of the present invention is to provide a new type of solution for attaching electrical components, particularly inductive components such as measuring transformers, to a mounting base, and for wiring their primary circuit rapidly and without the possibility of faulty coupling. This is achieved with an arrangement of the invention, which is characterized in that the terminal block comprises a first contact piece of a plug-in connector, and the component comprises a second contact piece of the plug-in connector, and that the component and the mounting base comprise interlocking parts for attaching the component to the base, whereby when the component is locked to the base, the contact pieces of the plug-in connector provide a galvanic contact between the component and the terminal block.

When the arrangement of the invention is applied, the transformers are thus locked mechanically to the base by means of snap-in-type locking means, as the transformers and the mounting base are provided with elements which interlock with each other. Such a mechanical locking also provides an electrical contact between the contact piece of the terminal block connected to the mounting base and the complementary contact piece attached to the electrical component. The terminal block preferably comprises the male contact piece of the plug-in connector, whereas the electrical component comprises its female contact piece. It is thus possible to encase the female contact piece neatly in the frame of the component. The male contact piece can be easily shaped as a bus bar, which is guided to a groove reserved for it when the terminal block module is mounted.

When a plurality of electrical components are attached to a mounting base in the arrangement of the invention, the components are preferably arranged on the mounting base in two or more rows so that the components in these rows are interposed with respect to each other, and each terminal block preferably comprises two contact pieces: a first one at the first row of components and a second one at the second row of components. This arrangement makes the construction compact and eliminates the possibility of faulty coupling. In addition, electrical coupling to a component in either the first or the second row can be performed by means of a similar terminal block. It is therefore necessary to have terminal blocks of only one kind, which is clearly an advantage in view of rationalization.

When the electrical component is a measuring transformer, the galvanic contact between the terminal block and the component preferably comprises a contact with the primary winding of the measuring transformer. The primary winding is the part of the measuring transformer where the strength of the current is several amperes, and thus the current cannot be conducted through copper foil strips of conventional printed boards, especially if the above-mentioned requirements set by DIN 57435 for the current-carrying capacity are taken into account.

BRIEF DESCRIPTION OF THE DRAWINGS

In the following, the arrangement of the invention will be described in greater detail with reference to the accompanying drawings, in which.

DESCRIPTION OF THE INVENTION

Figure 1:
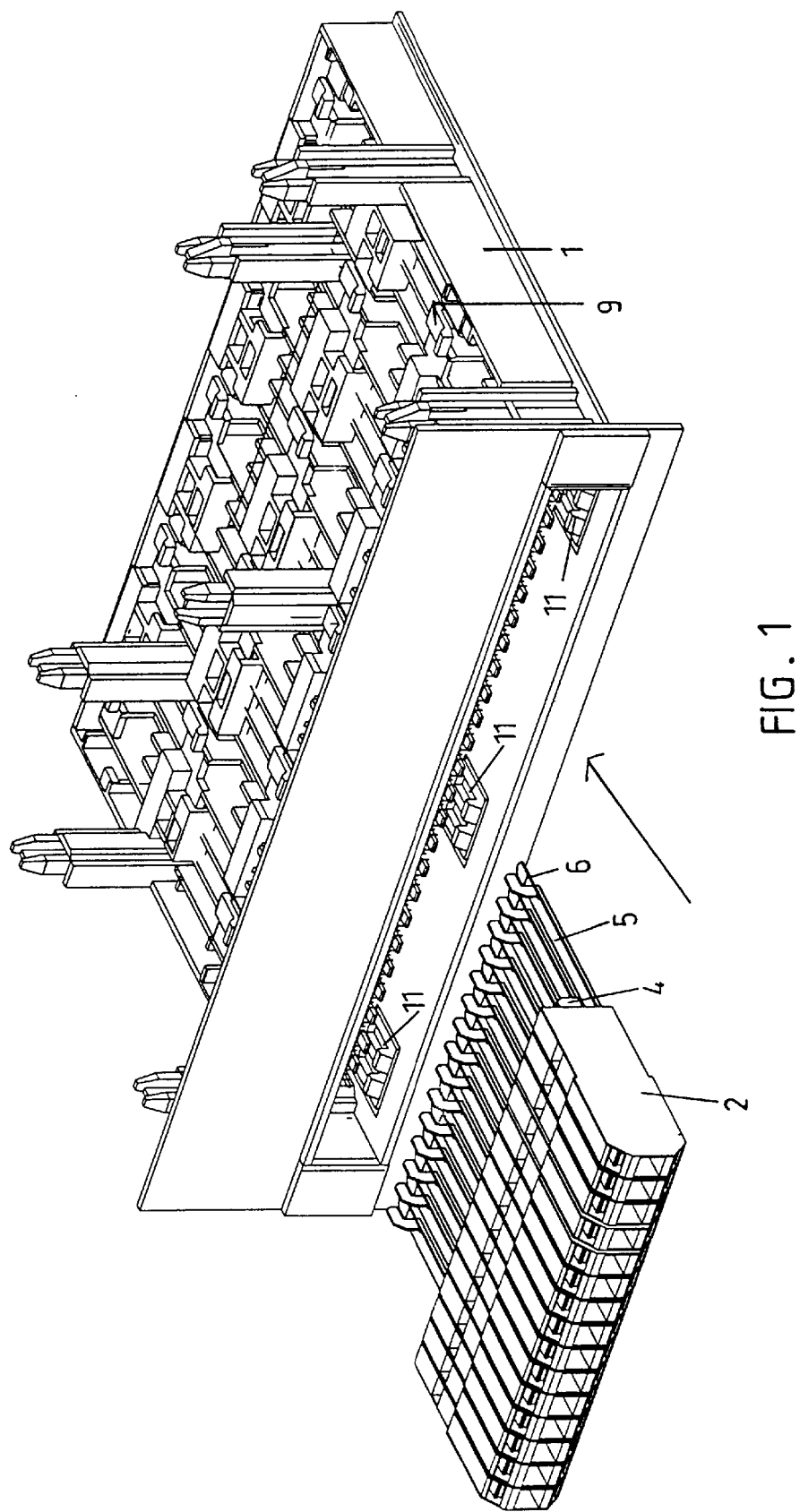
FIG. 1 is a perspective view of an illustrative embodiment of a base suitable for use in the arrangement of the invention and of an illustrative embodiment of a terminal block to be connected to it.

FIG. 1 is a perspective view of an illustrative embodiment of a mounting base suitable for use in the arrangement of the invention. The mounting base comprises a plurality of compartments or recesses into which the electrical components can be pressed so that the shape of the mounting base guides each component to its correct place. The base is provided with a plurality of locking tongues or the like 9, by means of which the components are locked in place after being pressed into their final positions on the base. To enable such a snap-in-type locking, the electrical component is naturally provided with a suitable counterpart for receiving the locking tongues. The mounting base 1 and the electrical component are also provided with other cooperating parts which guide the component to its correct position on the mounting base. In this application, such cooperating parts and the snap-in-type locking tongues or corresponding locking means provided in them will be called interlocking parts. Interlocking parts of this kind, which are indicated in the drawings by way of an example by reference numerals 8 and 9, also guide the component when it is pressed into its place and lock it in its desired final position. The purpose of the interlocking parts and the locking means is to support the components and to lock them onto the mounting base so firmly that the components are not detached under any mechanical stresses.

FIG. 1 further shows an illustrative embodiment of terminal blocks 2 to be connected to the edge of the mounting base 1. In FIG. 1, the terminal blocks 2 form a terminal block module intended for a plurality of electrical components. The terminal block module illustrated in FIG. 1 is suitable for connecting five measuring transformers, since one measuring transformer requires three terminal blocks. To facilitate the mounting, the terminal blocks have, however, been combined to form larger terminal block modules (comprising e.g. 15 terminals as in FIG. 1), which are also locked to the edge of the mounting base by means of snap-in-type locking tongues. These locking tongues can be seen in FIG. 1, where they are indicated by reference numerals 11. Locking tongues are provided both above and below the terminal blocks for locking the terminal block module reliably in its place.

Figure 2:
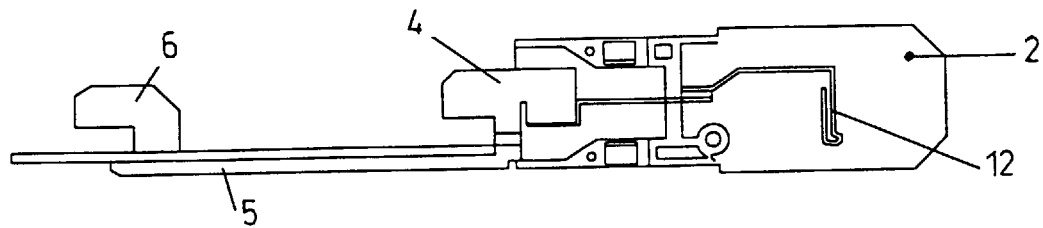
FIG. 2 is a cross-section of the terminal block shown in FIG. 1.

For connections to be made at its end facing the base, the terminal block 2, shown in cross-section in FIG. 2, comprises a bus bar 5 with two flat male contact pieces 4 and 6. When the terminal block of FIG. 2 is pushed into its place at the edge of the mounting base 1, the bus bar 5 is placed in a groove provided in the mounting base so that the contact pieces 4, 6 remain visible to allow an electrical connection to be made to one of them. The conductor which carries the signal to be measured to the terminal block 2 is connected in a conventional manner by means of a connection screw to a contact strip 12 disposed within the case of the terminal block. A current or voltage signal to be measured is thus applied to these terminal blocks.

Figure 3:
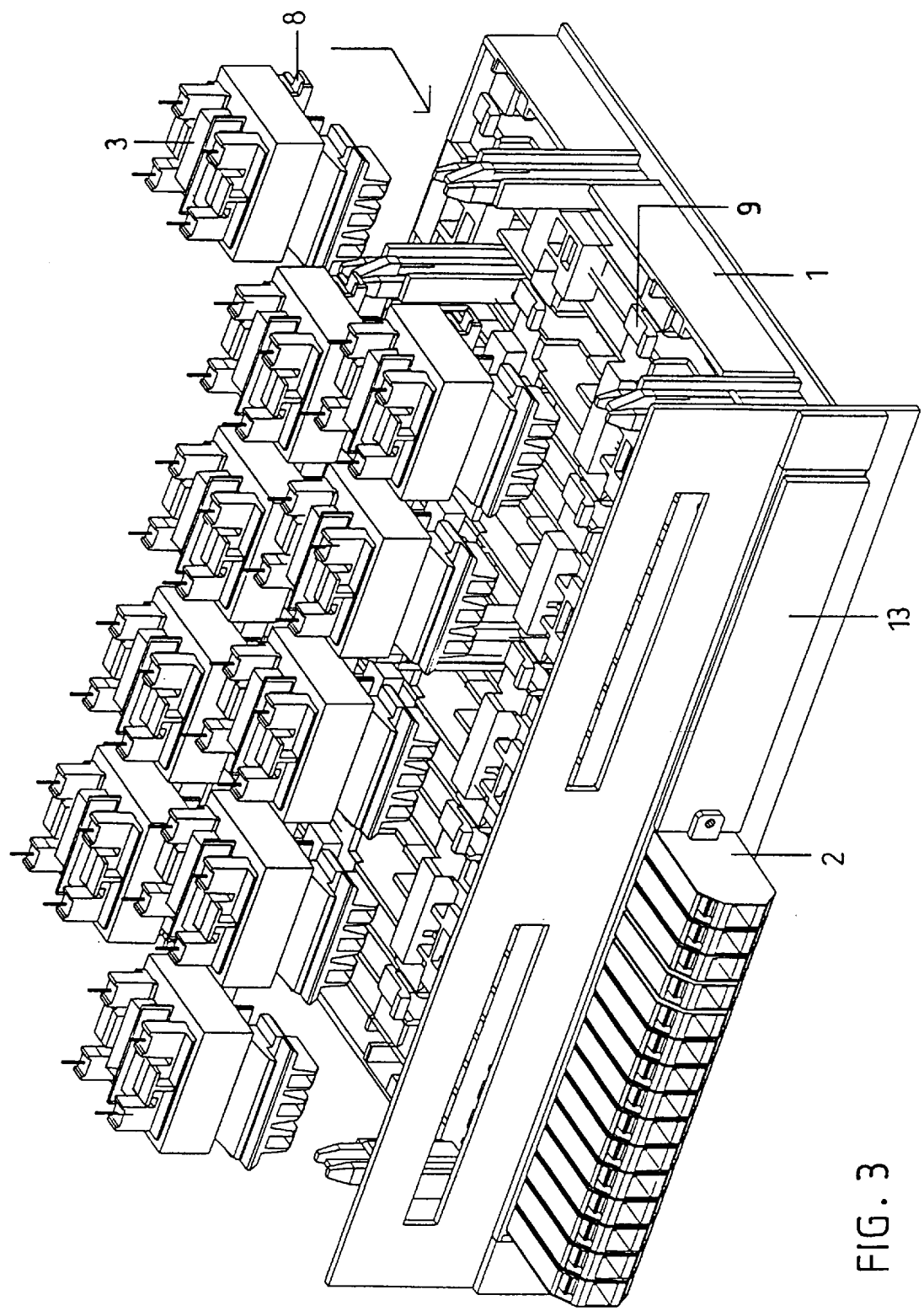
FIG. 3 is a perspective view of the arrangement of FIG. 1 when the terminal blocks have been attached to the mounting base and the electrical components are being attached thereto.

In the case illustrated in FIG. 3, the terminal block module is inserted in its place at the edge of the mounting base 1, and the other end of the space reserved for terminal blocks is covered with a covering plate 13. FIG. 3 also shows a number of measuring transformers 3 to be attached to the mounting base. As stated above, the terminal block module shown in the figure is sufficient for connecting only five measuring transformers; in practice, these would be the five transformers farthest on the left in FIG. 3, three of them in the front row, i.e. the row closer to the front panel, and two in the back row. As shown in FIG. 3, a measuring transformer is attached to the mounting base 1 by bringing it at first to the correct position above the mounting base and by pressing it then into the correct place on the mounting base so that the cooperating parts of the mounting base and the measuring transformer interlock with each other. Thereafter the measuring transformer 3 is pushed towards the terminal block 2, whereby the locking means lock the measuring transformer 3 in its place; at the same time, an electrical contact is formed between a female contact of crimp terminal 7 of the measuring transformer 3 and the contact piece 4 or 6 of the terminal block 2. This is illustrated in greater detail in FIG. 4.

Figure 4:
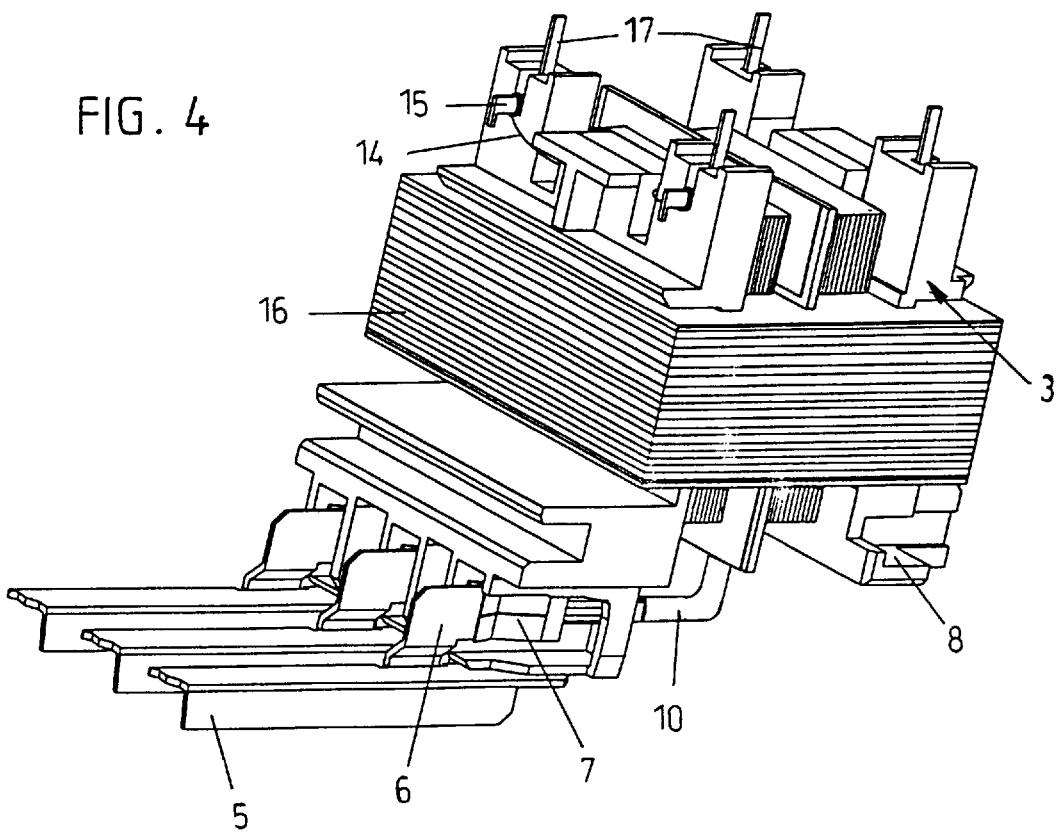
FIG. 4 is a more detailed view of the electrical component and its electrical coupling to the contact piece of the terminal block.

FIG. 4 shows an illustrative embodiment of a measuring transformer suitable for use with a mounting base of the invention. The coil former illustrated differs from a conventional one in that it comprises parts, or attachment lugs 8, interlocking with the mounting base 1 for attaching the transformer thereto. The manufacture of a measuring transformer according to FIG. 4 comprises the steps of winding a secondary winding onto a coil former, and soldering its ends 14 to solder lugs 15 positioned at the end of the coil former opposite to the attachment lugs. In order to wind the two primary windings of the transformer, the wires needed for each primary winding are at first cut, and their ends are provided with crimp terminals 7 in such a way that one end of each wire 10 is inserted into a crimp terminal 7 common to all the windings. Subsequently, the first terminal is pushed into a space provided for it in the coil former, and is snappingly locked in its place. The first winding portion is thereafter wound, and the contact connecting the first and the second winding portion is positioned in the space provided for it. The second winding portion is then wound, and the third contact is inserted in its place in the same way as the two preceding ones. Subsequently, the E/I transformer plates 16 are piled up, and the transformer is varnished. At this stage, the transformer is in the form shown in FIG. 4 and ready to be inserted in its place on the mounting base.

When a transformer is inserted in its place, the attachment lugs of the coil former are pressed into corresponding grooves on the mounting base, and the transformer is moved a few millimeters towards the terminal block 2, whereby an electrical contact is formed between the female contacts of crimp terminal 7 in the transformer and the contact 6 connected to the bus bars 5 of the terminal blocks. In this case, the transformer is connected to the second row, i.e. to the row further from the front panel. If the transformer were positioned in the row which is closer to the front panel, it would be connected to the contact piece 4 of the terminal block 2.

As can be seen from FIG. 3, the transformers in the first and the second row are interposed with respect to each other. This saves room on the mounting base, and in addition, helps to avoid faulty connections, as it is not possible to connect a transformer to both contact pieces 4 and 6 of the terminal block 2 at the same time.

Of measuring transformers, current transformers are those whose primary windings carry a higher current, wherefore they are mounted using the arrangement of the invention. They must therefore be mounted either in the first or in the second row from the front panel. Voltage transformers, in turn, can be mounted in any row, i.e. in the first or second row, or in the third row, which is not connected to the terminal blocks 2. The connections of both the primary and the secondary windings of the voltage transformers to be mounted in the third row are made through solder peaks 17 which can be seen on top of the transformers. In practice, this is performed in such a way that after the transformers have been locked onto the base, a printed board with through holes for the solder peaks is placed on top of the transformers 3, and the solder peaks are soldered in a conventional manner to the copper foil strips on the printed board. This procedure is followed with the connections of the secondary windings of the voltage and current transformers in both the first and the second row, and with the connections of both the primary and the secondary windings of voltage transformers in the third row, since the currents in these windings are so low that they can be conducted through copper foil strips of the printed board.

The arrangement of the invention allows a combination of measuring transformers needed for each specific case to be manufactured extremely simply, reliably and rapidly. The correct mounting of the measuring transformers can be easily ensured by providing the measuring transformers with clearly visible indications of their type. No other information is needed, as the terminals of both the primary and the secondary winding are located in their fixed places in the coil former.

In the above, the arrangement of the invention has been described by way of an example with reference to only one embodiment. It will be understood that, as regards the appearance, the invention can be modified even significantly according to the electrical component to be used without departing from the scope of protection defined by the appended claims or from the basic idea of the invention, according to which components are locked to a mounting base by mechanical interlocking parts, and at the same time as the mechanical locking takes place, an electrical contact is also formed between a first contact piece in the component and a second contact piece on the mounting base.

I claim:

1. An arrangement for attaching an electrical component to a mounting base and for connecting said electrical component galvanically to a terminal block connected to the mounting base, wherein each terminal block comprises a first contact piece of a plug-in connector; and each electrical component comprises a second contact piece to receive the plug-in connector; and, each electrical component and the mounting base include interlocking parts for attaching the electrical component to the mounting base, so that when the electrical component is locked to the mounting base, the first contact piece mechanically locks with the second contact piece and simultaneously provides a galvanic contact between the electrical component and the terminal block and wherein the electrical component is a measuring transformer, and wherein the galvanic contact between the terminal block and the electrical component comprises a contact with a primary winding other than measuring transformer.

2. An arrangement for attaching a plurality of electrical components to a mounting base and for connecting each of said plurality of electrical components to a corresponding one of a plurality of terminal blocks, wherein each of said plurality of terminal blocks comprises first contact pieces of a plug-in connector; each of said plurality of electrical components comprises a second contact piece to receive the plug-in connector; the plurality of electrical components and the mounting base comprise interlocking parts for attaching each of the plurality of electrical components to the mounting base, such that when the plurality of electrical components are locked to the mounting base, each of said first contact pieces mechanically locks with a corresponding second contact piece to simultaneously provide a galvanic contact between the plurality of electrical components and the plurality of terminal blocks; and wherein the plurality of electrical components are positioned on the mounting base in at least in two rows so that the plurality of electrical components in said rows are interposed with respect to each other, and each of the plurality of terminal blocks is connected to a corresponding two of the plurality of electrical components so as to form said rows.

3. An arrangement for mechanically attaching a plurality of electrical components to a mounting base and for electrically connecting each of said electrical components selectively, one at a time galvanically to a selected one of a plurality of terminal blocks, each terminal block being attachable to said mounting base and including a first contact piece of a plug-in connector having first and second contacts, each electrical component including a second contact piece for receiving one of the first and second contacts of the first contact piece, each electrical component and said mounting base including corresponding interlocking parts for attaching the electrical component to the mounting base such that when the electrical component is interlocked with said mounting base, one of the first and second contacts of said first contact piece of the terminal block mechanically locks with said second contact piece of the electrical component and simultaneously provides a galvanic contact therebetween, said base including first and second rows of interposed locations for receiving the electrical components therein, and said first and second contacts of said first contact piece being located such that each electrical component is selectively positionable on the mounting base in one of said first and second rows so that said each component is electrically isolated from the electric components.

4. An arrangement according to claim 3, wherein the first contact piece comprises a male contact and the second contact piece comprises a female contact for receiving the male contact.

5. An arrangement according to claim 3, wherein the first contact piece includes first and second male contacts and the second contact piece includes a female contact.

6. An arrangement according to claim 5 wherein the first male contacts are located in the first row and the second male contacts are located in the second row.

7. An arrangement for attaching at least one electrical component to a mounting base and for selectively connecting said at least one electrical component galvanically one at a time to at least one terminal block connected to the mounting base, said arrangement comprising: a plug-in connector formed on said at least one terminal block, including a first contact piece; a second contact piece secured to the at least one electrical component, said second contact piece for mating with the first contact piece; interlocking parts on the at least one electrical component and on the mounting base for lockably attaching the at least one electrical component thereto, so that when the at least one electrical component is lockably attached to the mounting base, said at least one electrical component is positionable on the base in one of at least two interposed rows, and simultaneously a galvanic contact occurs between the first contact piece and the second contact piece; and wherein said electrical component comprises a measuring transformer; and wherein the galvanic contact comprises contact between each primary winding of the measuring transformer and the terminal block.

* * * * *